United States Patent [19]

Bennett et al.

[11] 3,992,615

[45] Nov. 16, 1976

[54] ELECTRO-OPTICAL RANGING SYSTEM FOR DISTANCE MEASUREMENTS TO MOVING TARGETS

[75] Inventors: Robert R. Bennett; John C. Nosler, both of Eugene, Oreg.

[73] Assignee: Sun Studs, Inc., Roseburg, Oreg.

[22] Filed: May 14, 1975

[21] Appl. No.: 577,312

[52] U.S. Cl. ............... 235/151.32; 144/209 R; 343/12 R; 356/5
[51] Int. Cl.² ............... G06G 7/78; G01C 3/08
[58] Field of Search ............... 235/151.3, 151.32; 356/5, 150, 160, 167; 350/96 R; 250/199, 552; 343/5 R, 5 DP, 12 R, 112 D; 144/209 R, 309 W

[56] References Cited
UNITED STATES PATENTS

| | | | |
|---|---|---|---|
| 3,527,533 | 9/1970 | Hook et al. | 356/5 |
| 3,728,025 | 4/1973 | Madigan et al. | 356/5 |
| 3,740,141 | 6/1973 | Dewitt, Jr. | 356/5 |
| 3,752,582 | 8/1973 | Troll et al. | 356/5 |
| 3,787,700 | 1/1974 | Chasson | 356/160 X |
| 3,852,579 | 12/1974 | Sohn et al. | 235/151.3 |
| 3,888,588 | 6/1975 | Granqvist | 356/5 |

*Primary Examiner*—Joseph F. Ruggiero
*Attorney, Agent, or Firm*—Chernoff & Vilhauer

[57] ABSTRACT

An electro-optical ranging system for taking rapid measurements of the distance to a moving target object, such as a rotating log whose cross-sectional configuration is to be determined prior to the performance of a processing operation thereon. An electro-optical transceiver illuminates a small portion of the target object with a narrow beam of light modulated by a reference R-F signal. Light reflected from the target object is received by a telescope in the transceiver and focused upon a photodetector for demodulation to generate a detected R-F signal. The distance to the object is then determined by measuring the relative phase of the reference and detected signals. First, a preliminary measurement is made by adjusting the relative phase of the two R-F signals, using a calibrated, digitally-controlled phase shifter, until the output of a comparator circuit is as nearly null as possible without exceeding a digital input word to the phase shifter corresponding to a distance less than or equal to the target object. The average amplitude of the comparator output signal corresponding to the aforementioned preliminary digital word is determined, and the average comparator output corresponding to the preliminary digital word as modified by the arithmetic addition of one bit thereto is next determined. The actual distance to the surface of the target object is then calculated by interpolating between the two resulting digital words to find an equivalent digital word corresponding to a null phase-comparator output. Parallax error is minimized and the signal-to-noise ratio of the detected signal is maximized by transmitting and receiving the light along a coaxial path. Errors due to changes in the D-C offset of the comparator output are eliminated by A-C coupling the comparator's input and output utilizing a chopper stabilization circuit. Automatic calibration of the system is accomplished by an electro-mechanical shutter, which upon command cuts off the transmitted beam to zero the transceiver, and an electro-mechanical mirror which upon command deflects the transmitted beam through a fiber-optic tube of known optical length to the photo-detector for enabling a calibration factor to be calculated. Control of the operation of the transceiver and calculation of the measured distance to the object is accomplished by a digital computer.

13 Claims, 8 Drawing Figures

ELECTRO-OPTICAL RANGING SYSTEM FOR DISTANCE MEASUREMENTS TO MOVING TARGETS

BACKGROUND OF THE INVENTION

This invention relates to electro-optical ranging systems, particularly systems for taking repetitive and rapid distance measurements to moving target objects, such as for example a rotating log whose surface contour is to be quickly determined prior to performing a processing function thereon so as to enable the adjustment of processing equipment to be set for maximizing the yield of usable wood products from the log.

In the production of wood veneer in the lumber industry it is highly desirable, both economically and ecologically, to maximize the yield of veneer from a given log. To do so, it is necessary to determine, in advance of peeling the log in the lathe, the optimum longitudinal axis for rotation of the log so that it may be mounted in the veneer lathe and rotated about such optimum axis. As explained in an earlier patent of the assignee of the present application, Sohn et al U.S. Pat. No. 3,852,579 entitled "Method and Apparatus for Determining the Surface Configuration of Elongate Objects, Particularly Logs" issued Dec. 3, 1974, the disclosure of which is hereby incorporated in its entirety by reference, one apparatus for finding such optimum axis utilizes a scanning array which is comprised of a plurality of electro-optical transceivers spaced along the length of a log and which, in conjunction with a digital computer, is used to determine the surface contour of the log, prior to its charging into a veneer lathe, as the log is rotated about a longitudinal axis in front of the scanning array. Based on the measurement data provided by the plurality of transceivers, the configuration of the log is determined and the location of the optimum spin axis for peeling is calculated by the digital computer which thereupon controls the charging of the log into the veneer lathe so as to be aligned for rotation about such calculated axis. In such fashion, with use of a mechanized and automatic system of the type described in the aforesaid U.S. Pat. 3,852,579, it is possible for a precise and accurate determination of the optimum axis of rotation for the log to be quickly made in the short interval of time elapsing between when the log is picked up, transported past the scanning array of transceivers while being rotated, and thereafter charged into the veneer lathe to be peeled.

In the transceivers used in the scanning array of the prior art system disclosed in the aforementioned patent, the distance to a point on the surface of a log at a cross-sectional location is determined by measuring the phase shift which occurs between a transmitted and received light beam associated with a particular transceiver unit as the light beam travels to the surface of the log and then is reflected back to the transceiver. This is accomplished by modulating the light beam with a referennce R-F signal and determining the phase shift between the reference signal and the detected envelope of the received light beam. Although the precision of such ranging systems has been improved by using two reference frequencies in heterodyning-type systems such as those disclosed in the aforementioned prior art system, Ruddock U.S. Pat. No. 3,446,971 and Hines et al U.S. Pat. No. 3,778,159, the accuracy of such instruments is difficult to control due to the several threshold crossings which must be detected in the heterodyning process.

In addition, a problem which is of particular importance in measuring the distance to a moving object such as a rotation log is that the log's reflectivity and thus the intensity of the received light may vary. As the log is rotated past the scanning beam of a given transceiver, changes in its reflectivity result from variations around its perimeter in its natural surface coloration and roughness, and from irregularities such as cracks. This results in a relatively rapid "scintillation" effect whereby variations in reflectivity occur during a given measurement, and in less frequent intensity changes occuring from log-to-log or measurement-to-measurement. Also, variations in the intensity of the received signal of such an optical system will result from the "dirty" environment inherently associated with a log handling apparatus such that particles of wood, dust and other materials interfere with the light beam and collect on the lenses. Such varying intensity makes it difficult to compare the phase of the reference signal to the detected envelope of the received signal because the amplitude of the output signal of R-F phase comparator devices is typically a function of input amplitude as well as relative phase. Thus, rapid, random reflectivity variations, or scintillation, tend to produce errors in a given measurement and less frequent variations tend to produce discrepancies from one measurement to another, thereby decreasing the overall accuracy of the ranging system and in turn the accuracy in determining the optimum spin axis, resulting in wasteful and uneconomical production of veneer. The present invention provides novel features which, among other advantages, enhance the precision and accuracy of an electro-optical ranging system the decrease errors caused by varying reflectivity of the target object.

SUMMARY OF THE INVENTION

In the ranging system of the present invention an electro-optical transceiver obtains data representative of the distance from the transceiver to the target object upon command from an associated digital computer and the computer uses the data to calculate the distance. The transceiver transmits a light beam modulated by a reference R-F signal to illuminate a small portion of the target object. The light reflected from the target object is received and demodulated to produce a detected signal at the same frequency as the reference signal. The relative phase of the reference and detected signals is measured to determine the distance to the target object.

A preliminary measurement of the relative phase is accomplished by adjusting the relative phase of the reference and detected signals using a calibrated, digitally-controlled phase shifter circuit until the amplitude of the output signal of a phase comparator circuit is as nearly null as possible without exceeding a digital input word to the phase shifter corresponding to a distance less than or equal to the actual distance from the transceiver to the surface of the target object. The phase shifter is set by appropriately changing its input digital word. This approach minimizes the number of threshold crossings which must be detected and isolates the errors produced by such detection to the single phase comparator circuit which may be carefully controlled for accuracy, and since the accuracy of the phase shifter is relatively easily maintained the accuracy and useful precision of the entire transceiver is enhanced thereby.

Following the aforedescribed preliminary measurement an interpolation operation using a split integration scheme takes place. First, with the phase shifter set according to its preliminary digital input word, the relative-phase-signal output of the phase comparator circuit is integrated for an initial one-half of an averaging period to determine partially the average amplitude $V_{1a}$ of the comparator output. One bit is then arithmetically added to the input digital word to the phase shifter and the output of the comparison circuit is integrated for an intermediate full averaging period to determine the average output of the comparator $V_{2a}$ corresponding to the new digital word. Subsequently the same bit is subtracted and the integration of the output of the comparator which started with the first one-half averaging period is completed during a final one-half averaging period to determine $V_{1a}$. Given the two average values of the comparator output and the preliminary digital word, a digital value which represents the actual distance to the target object and corresponds to a null value of the output of the comparison circuitry may then be computed by linear interpolation.

Averaging of the output of the comparator minimizes errors resulting from variations in the surface contour of the target object during the time period allocated for each measurement. Interpolation between the two average values determined during such time period eliminates errors in measurement of the distance due to variations in reflectivity from measurement to measurement, assuming a constant reflectivity during each measurement; furthermore, the aforedescribed split integration scheme eliminates errors in interpolation due to first order variations in the intensity of the received signal during a given measurement.

Errors due to circuit drift and reflectivity variations which typically affect the D-C offset in the output of comparator circuitry are eliminated by A-C coupling of this circuitry. A R-F switch driven by an audio oscillator modulates the detected signal prior to its input to the comparator. The output of the comparator may then be A-C coupled to following circuitry by a capacitor which eliminates variations in the D-C offset due to drift and changing intensity. The audio-frequency output of the comparator is rectified by an A-F switch operated in synchronism with the R-F switch to produce a stable D-C signal proportional to the difference between the distance represented by the input digital word to the phase shifter and the actual distance from the transceiver to the log surface.

Parallax errors which would otherwise result from different transmitted and received beam paths are eliminated by an optical system which coaxially transmits and receives the light beam. This optical system also increases the strength and signal-to-noise ratio of the received signal.

Control of the electro-optical ranging system is accomplished by a digital computer which transmits commands to the transceiver and performs the interpolation calculation to determine the distance to the target object. In addition the transceiver itself contains a sequencer logic and data handling circuit which is programmed to carry out the necessary steps to perform the distance measuring operation and prepare the data for input to the computer upon command.

Automatic calibration is performed upon command from the controlling computer by an electro-mechanical shutter which blocks the transmitted light beam for zeroing the system and an electro-mechanical mirror which deflects the transmitted beam through a fiber-optic tube of known optical length to the receiving circuitry for computing a calibration factor.

The electro-optical ranging system is integrated with a veneer production apparatus such that the digital computer which controls the transceiver also controls the manipulation of a log into a veneer lathe to maximize the yield of veneer. The computer causes the log to be rotated about a longitudinal axis in front of the scanning transceiver while obtaining translational and angular position data from the charger mechanism and calculates the optimum spin axis of the log from the computed distance values and position data. It then causes the log to be placed into the veneer lathe to rotate about the optimum axis for peeling.

It is therefore a principal objective of the present invention to provide a novel and improved method and system for measuring the distance to an object.

It is a particular objective of the present invention to provide such a distance-measuring method and system which exhibits high accuracy and precision.

It is a further objective to provide such a distance measuring method and system which is particularly suited for measuring the distance to rapidly moving objects such as a rotating log in a veneer production apparatus.

It is yet another objective to provide such a distance measuring method and system which may be operated and calibrated automatically.

It is a principal feature of the present invention that the distance is partially measured by adjusting the relative phase of the transmitted light beam and its detected reflection to within a predetermined difference from null utilizing a calibrated phase shifter circuit.

It is another principal feature of the present invention that the distance is partially measured by linear interpolation between two predetermined values to enhance the precision and accuracy of the system.

It is a further feature of the present invention that calibration is achieved using a fiber-optic reference path of known optical length.

The foregoing and other objectives, features and advantages of the present invention will be more readily understood upon consideration of the following detailed description of the invention, taken in conjunction with the accompanying drawings.

DESCRIPTION OF THE PREFERRED EMBODIMENT

To understand the operation of the preferred embodiment of the ranging system of the present invention and its utilization in an apparatus for determining the optimum spin axis of a log for peeling in a veneer lathe to maximize the yield of veneer therefrom as more fully explained in the aforementioned U.S. Pat. No. 3,852,579, it is helpful first to consider the apparatus shown in FIG. 1. In the aforementioned axis-determining apparatus a log 10 is supported by a charger mechanism 12 and held by a pair of spindle arms 14 for rotation about an initial longitudinal axis while being optically scanned by one or more light transceivers 16a–16n to determine the surface contour thereof. The transceivers 16a–16n are spaced longitudinally along the log at known fixed points so that, as the log rotates, the ranging system will determine the distance from each transceiver to the surface of the log for a plurality of points around the circumference of the log at one or more locations along the length of the log resulting in discrete data representing profiles of the log at cross-sections corresponding to the locations of the transceivers. The entire operation of the apparatus, including the ranging system, is controlled by a computer 18 of either the special-purpose or general-purpose type which sends operational control signals to the transceivers 16a–16n and the charger 12 and receives distance data from the transceivers, translational-position data corresponding to the coordinates of the initial axis of rotation of the log from the charger 12 and data representing the angular position from a shaft encoder 20 connected to a spindle arm 14. The computer 18 may be programmed to generate the appropriate control signals to rotate the log in front of the scanning transceiver, cause the transceivers to measure their distance from the surface of the log and place the log in the veneer lathe for rotation about its optimum axis. Twenty-four measurements equally spaced around the circumference of the log (i.e. every 15°) at ten cross-sectional locations along the length of the log would be sufficient to accurately describe the surface contour of the log for purpose of calculating the optimum spin axis thereof. The computer is also programmed to calculate the optimum spin axis for the log based upon the distance and position data, as explained in the aforementioned U.S. Pat. No. 3,852,579 at col. 7, 51-col. 8, line 47.

Figure 1:
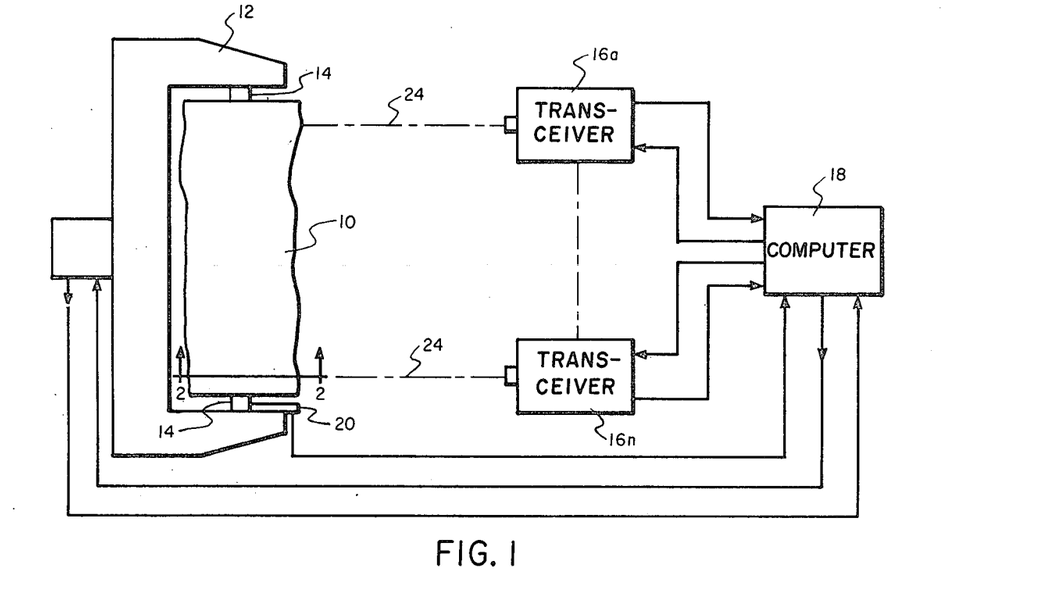
FIG. 1 is a top, partially schematic view of an embodiment of the electro-optical ranging system of the present invention incorporated as part of an apparatus for measuring the surface contour of a log and, from such measurement, calculating the optimum spin axis thereof for peeling of the log in a veneer lathe.
Figure 2:
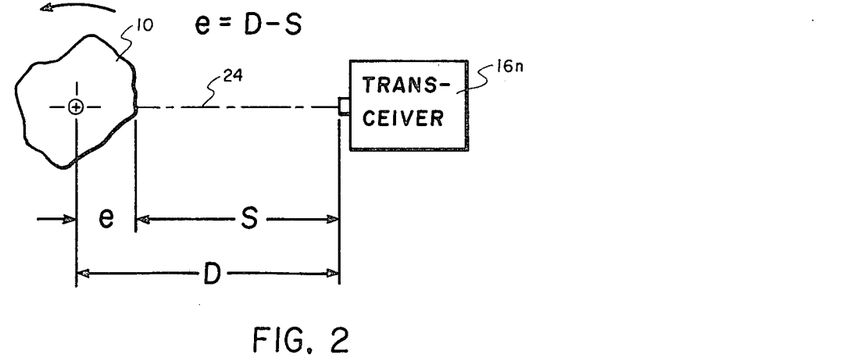
FIG. 2 is an enlarged, sectional view along line 2—2 in FIG. 1 showing certain geometrical relationships utilized in incorporating the electro-optical ranging system of the present invention in the contour-measuring apparatus of FIG. 1.

Referring now to FIG. 2 as well as FIG. 1, as the log 10 is rotated in the charger 12 about a preliminary axis its surface profile in relation to the preliminary axis is represented by the value e as a function of the angular position of the log. The transceivers 16a–16n measure the distance S therefrom to the surface of the log. Since the position of the transceivers is known and the position of the preliminary axis is known, the relative distance D therebetween is also known and the value e may be computed by the equation:

$$e = D - S \qquad (1)$$

The distance S is determined by measuring the phase shift of a beam of light transmitted to the surface of the log, reflected therefrom and received by the transceiver portion of the ranging system. A laser beam light source is utilized to provide a narrow beam which illuminates only a small portion of the log and to produce a reflected beam with an adequate signal-to-noise ratio. The laser beam is modulated by a R-F reference signal prior to transmission to the surface of the log and the reflected, received light is demodulated to obtain a detected envelope signal whose phase is compared to the phase of the reference signal for determining the phase shift of the light beam and thereby the distance S to the surface of the log.

Figure 3:
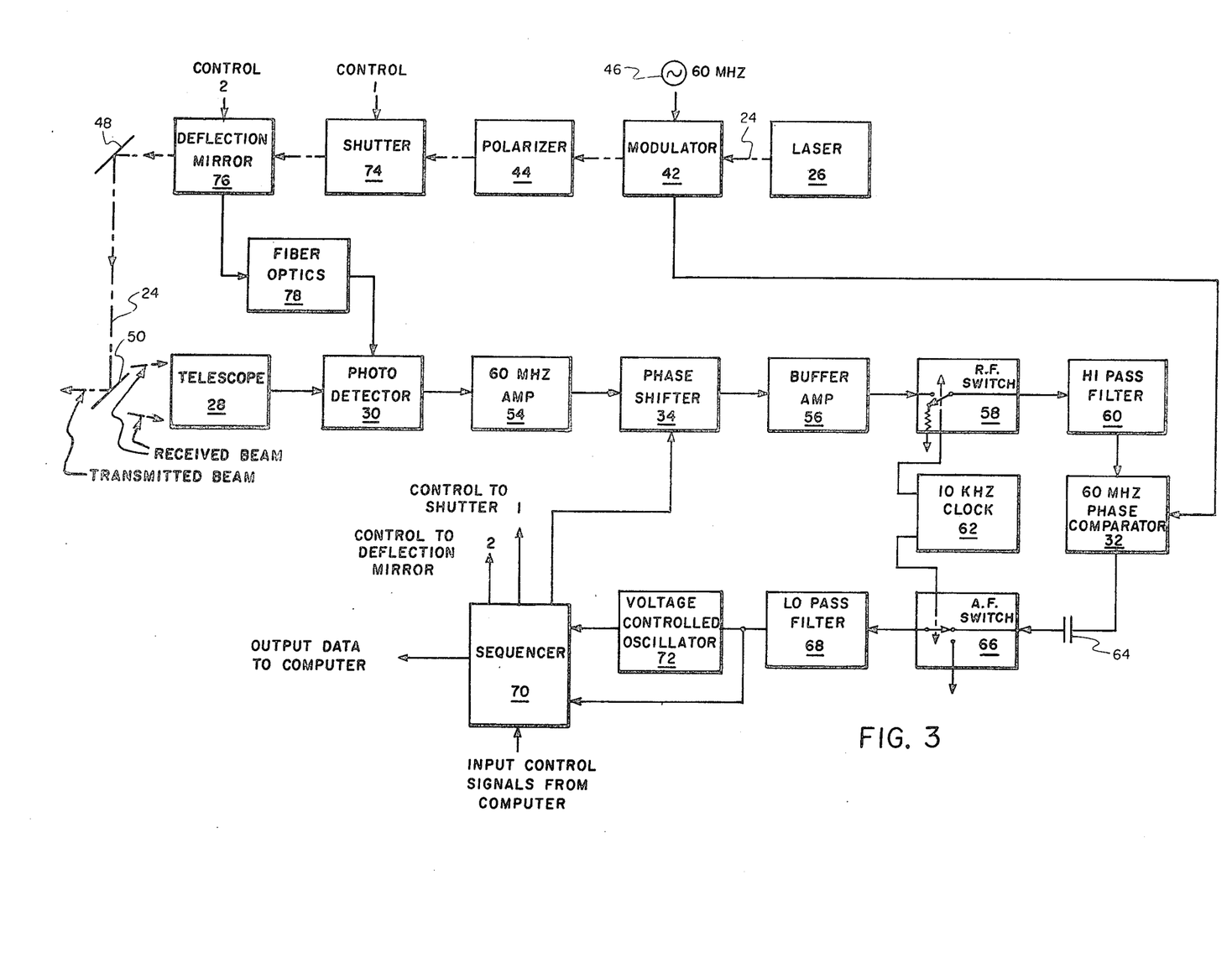
FIG. 3 is a functional block diagram of the transceiver portion of the preferred embodiment of the ranging system of the present invention.

Turning now to the block diagram in FIG. 3 of the transceiver portion of the optical ranging system, a light beam 24 is generated by a laser 26, modulated by the reference signal, in this case 60 MHz but not limited thereto, and transmitted by an optical system to the rotating log. The light reflected from the rotating log is received by a telescope 28 and focused upon a photo-detector 30 which demodulates the light beam to produce a detected envelope signal whose phase is compared to the phase of the reference signal by a 60 MHz phase comparator 32 to determine the distance S.

A preliminary measurement of the distance S from the transceiver to the surface of the log is accomplished by adjusting the phase of the detected envelope signal relative to the phase of the reference signal toward a null condition utilizing a calibrated, digitally-controlled phase shifter 34 (i.e., a variable delay circuit), the null condition corresponding to a phase shifter setting representing the best measurement of the distance to the surface of the log. The phase-shifter is adjusted until the output of the 60 MHz phase comparator 32 is a low value within a predetermined difference from null, but of a polarity corresponding to a distance less than the distance to the surface of the log. At this point the setting of the phase shifter is such that arithmetic addition of one bit to its input digital word would cause the phase comparator 32 to change its output polarity to correspond to a distance beyond the surface of the log. A phase shifter which will perform adequately for use in a ranging system of the type described herein is, for example, one which utilizes digitally selectable strip lines to vary the signal delay, as is available from Diaco Industries, Inc. of Compton, California.

Adjustment of the phase-shifter is accomplished by first turning on the most significant bit of its input digital word and testing the polarity of the output signal of the phase comparator. If the phase comparator output changes polarity, indicating that the phase has been shifted more than an amount corresponding to the distance to the surface of the log, the most significant bit is turned off and the next most significant bit is tested in the same manner. On the other hand, if turning on the most sigificant bit of the phase shifter does not result in a change of polarity in the phase comparator output the most significant bit is left on and the next most significant bit is tested. Each of the bits of the phase shifter is similarly tested sequentially in descending order of significance until a complete digital input word to the phase shifter is determined. The aforementioned digital word will thus be representative of a distance equal to or less than the distance from the transceiver to the surface of the log with predetermined precision, for example within 0.5 inches. Of course, it should be recognized that other successive approximation algorithms may be utilized to determine the preliminary digital word without departing from the principles of this invention. This approach to determining the distance to the surface of the log, by measurably shifting the phase of the received signal until a nearly null condition is indicated by a phase-comparator, is particularly advantageous in obtaining the needed accuracy to peel veneer off a log because it tends to minimize the number of threshold crossings which must be detected in determining the relative phase and thus tends to isolate the sources of error to one circuit, in this case the 60 MHz phase comparator 32, which may be carefully controlled to obtain the needed accuracy.

Figure 4:
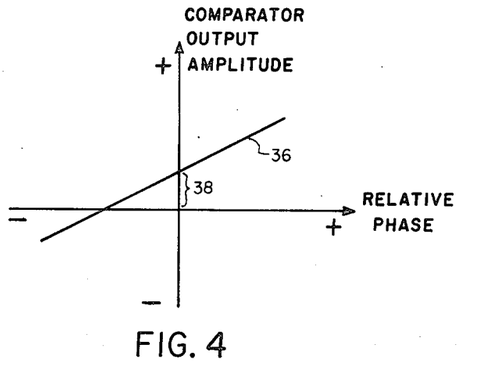
FIG. 4 is an exemplary graph of the relationship between the output amplitude of a 60 MHz phase comparator utilized in the preferred embodiment of the present invention and the relative phase of the two comparator input signals.

To understand the more specific operation of the ranging system it is first helpful to consider the effect of changes in the intensity of the light reflected from the log on the output of a typical 60 MHz phase comparator 32 such as a Lorch Electronics Model CP-411-60. Referring to FIG. 4, the output of the 60 MHz phase comparator is a signal, typically a voltage, whose amplitude is proportional both to the relative phase of the reference input signal and the detected envelope input signal, and to the amplitude of the detected, received signal as represented by the curve 36. The locus of points along the curve represents the proportionality between the output amplitude of the phase comparator and the relative phase of its two input signals, and the slope of the curve represents the proportionality between the output amplitude of the comparator and the amplitude of the detected, received signal, which is in turn proportional to the intensity of the received light and principally dependent upon the reflectivity of the log surface. In addition, inherent design limitations typically prevent perfect balancing of the components of the comparator which results in an offset voltage 38 which also is a function of the amplitude of the detected signal and accordingly varies with the intensity of the received light. Thus, to determine accurately the relative phase of the transmitted and received signals from the output of the phase-comparator it is desirable to minimize the effects of variations in the reflected light intensity on the output of the phase comparator 32.

In the preferred embodiment of the present invention a linear interpolation technique is utilized to provide additional measurement precision while eliminating the effect of variations in the intensity of light reflected from a rotating log resulting from the different reflective characteristics of the surface of various logs and of measurement points around the circumference of a given log. The preliminary balance of the comparator results in a digital word $DW_1$ representative of a distance less than or equal to the actual distance from the transceiver to the surface of the rotating log. The relative-phase-signal output of the phase-comparator will exhibit a voltage $V_1$, within a predetermined difference from the null output of the comparator, which is representative of the difference existing between the distance to the surface of the log (corresponding to perfect null) and the distance represented by the digital word $DW_1$. Once the preliminary balance is made, one bit, corresponding to a predetermined distance, is arithmetically added to the phase shifter input word resulting in a new digital word $DW_2$ which represents a distance slightly greater than the actual distance from the transceiver to the surface of the log, and the output of the phase comparator accordingly exhibits a corresponding new voltage $V_2$ representative of the difference between the actual distance to the log and the distance represented by the digital word $DW_2$. It has been found that the actual distance to the surface of the log, represented by $DW_0$, can be closely approximated by the linear interpolation equation.

$$DW_0 = DW_1 + \frac{(DW_2 - DW_1)}{(V_2 - V_1)}(V_0 - V_1) \qquad (2)$$

where $V_0$ is the comparator output voltage corresponding to perfect phase balance, i.e. null. Assuming $V_0 = 0$ (although in practice $V_0$ may be a known offset voltage), equation 2 can be expressed as follows:

$$DW_0 = DW_1 + (DW_2 - DW_1)\frac{V_1}{V_1 - V_2} \qquad (3)$$

Therefore, the actual distance to the surface of the log can be calculated from $DW_1$, $DW_2$, $V_1$ and $V_2$. It should be recognized that more than one bit might be added to the initial digital word $DW_1$ to produce a new digital word $DW_2$ without changing the result of the aforedescribed interpolation technique since the change produced in $DW_2$ will also be reflected as a corresponding change in $V_2$. Furthermore, it also should be recognized that the technique is not limited to the particular choice of distance relationships described herein and that other distance relationships may be utilized to estimate the actual distance to the log by interpolation (or extrapolation) without departing from the principles of this invention.

Since the output voltage V of the phase comparator 32 is proportional to both the relative phase P of the input signals and the intensity of the received light signal I (i.e., V=CPI, where C is a constant of proportionality), the following relationship exists:

$$\frac{V_1}{V_1 - V_2} = \frac{CP_1 I}{CP_1 I - CP_2 I} = \frac{P_1}{P_1 - P_2}$$

Thus, it can be seen that, assuming the intensity of the reflected light to be constant during a given distance measurement, the effect of intensity variations from measurement-to-measurement is eliminated by the linear interpolation described by equation (2).

Figure 5A:
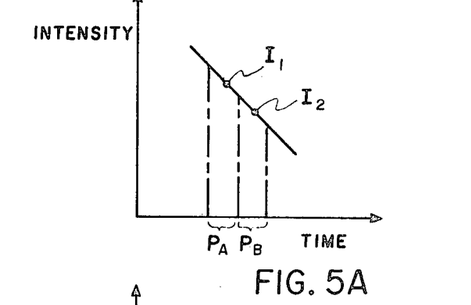
FIGS. 5A and 5B are exemplary graphs of the intensity of the received light signal as a function of time for illustrating the effect of first-order changes in received-signal intensity with time on the measured distance to the surface of a log where the distance is computed by interpolating between two average values (A) determined one after the other, and (B) determined by splitting the averaging integration for one value so that it takes place before and after the averaging integration for the other, respectively.

To minimize errors otherwise resulting from variations in the surface contour of the rotating log during the time period allocated for a given measurement the average phase comparator output amplitude is obtained by integrating the output signal over a portion of the time period allocated to the measurement. However, integrating the output of the phase comparator increases the possibility that variations in intensity of the reflected signal will occur during the measurement and, since the accuracy of interpolation by equation (2) depends upon constant intensity, and adverse effects due to intensity variations during the determination of average values $V_{1a}$ and $V_{2a}$ must be eliminated. Referring to FIG. 5A, the effect of first order variations in the intensity of the received signal with time during the measurement is illustrated. Given that the comparator output is integrated during period $P_A$ to obtain $V_{1a}$ and during period $P_B$ to obtain $V_{2a}$, it can be seen that the average intensity for $V_{1a}$ is $I_1$ whereas the average intensity for $V_{2a}$ is $I_2$.

Figure 5B:
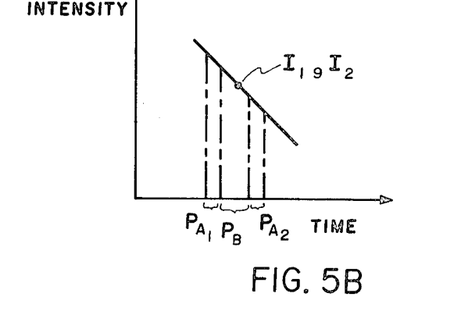

A correction for such first order intensity variations is achieved by splitting the period $P_A$ into two halves $P_{A1}$ and $P_{A2}$, first integrating the output of the comparator during $P_{A1}$, thereafter adding one bit to $DW_1$ and integrating the output during $P_B$ to obtain $V_{2a}$, and subsequently subtracting the one bit from $DW_2$ and completing the integration to obtain $V_{1a}$ during $P_{A2}$, as illustrated in FIG. 5B. It can be seen that, as a result of the aforementioned integration method, the average intensities for both $V_{1a}$ and $V_{2a}$ are identical.

Figure 6:
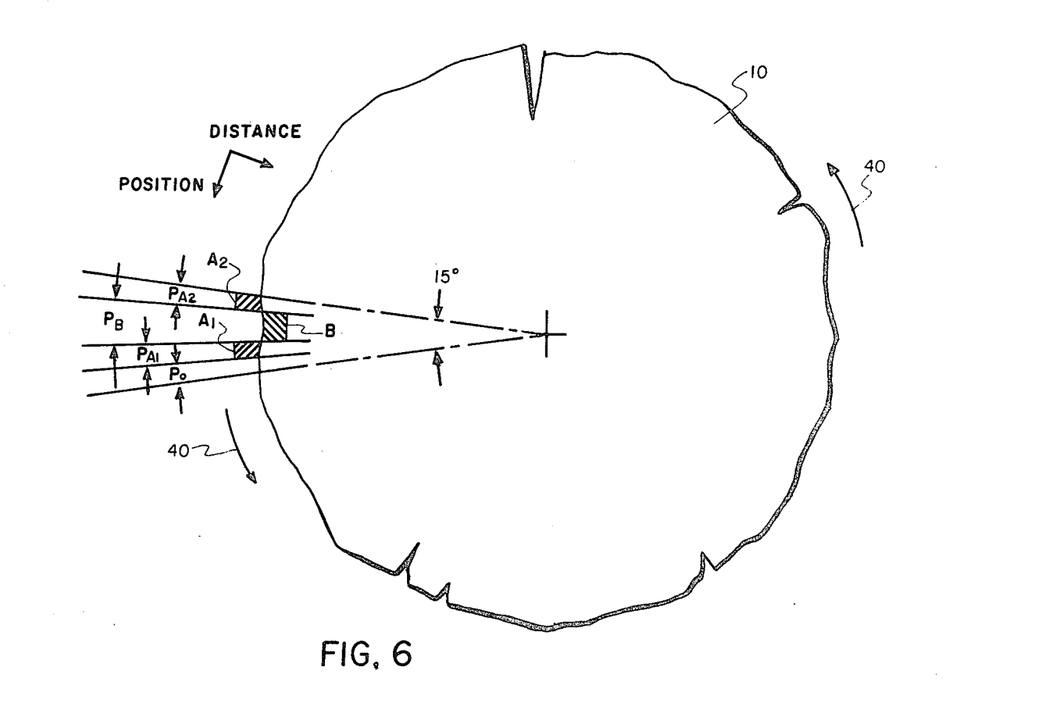
FIG. 6 is a cross-section of an exemplary log whose surface contour is to be measured by the system of the present invention, including a graphical representation of distance as a function of position illustrating the manner in which the surface of the log is scanned by the ranging system as the log is rotated.

Referring now to FIG. 6, as the log 10 rotates past the transceiver light beam in the direction indicated by the arrows 40, the preliminary distance measurement is accomplished during period $P_0$, the first half of the integration (represented by area A1) for obtaining $V_{1a}$ takes place during period $P_{A1}$, the entire integration (represented by area B) for $V_{2a}$ takes place during period $P_B$ and the rest of the integration (represented by area A2) for $V_{2a}$ takes place during period $P_{A2}$, all of which takes place within a predetermined angular displacement of the log, for example 15°.

Turning now more specifically to the structure of the preferred embodiment for performing the aforedescribed operations, with reference again to FIG. 3, the laser 26, which may be for example of the helium-neon type, such as a Model LSR-5 manufactured by CW Radiation, Inc., transmits, its light beam (at a visible wavelength of 632.8nm for a helium-neon laser) through an electro-optical modulator 42, for example a KDP crystal modulator such as a Lasermetrics Model 1053-X. the light beam 24 subsequently passes through a polarizer 44 which acts in concert with the modulator 42 to amplitude modulate the intensity of the light beam.

A signal source 46 applies a 60 MHz signal to the modulator 42 for amplitude modulating the light beam 24. The 60 MHz reference signal for application to one input of the 60 MHHz phase comparator 32 is obtained by tapping the modulator 42 itself. Since the voltage applied to the modulator typically is much too great for application to the input of the phase comparator, the reference signal is obtained by utilizing a capacitor divider comprising the modulator itself in series with another, larger capacitor whereby the modulation signal is applied across the entire divider and the reference signal is obtained from the voltage across the larger capacitor. This arrangement ensures that the phase relationship between the modulation envelope of a transmitted light beam and the reference signal is constant.

Figure 7:
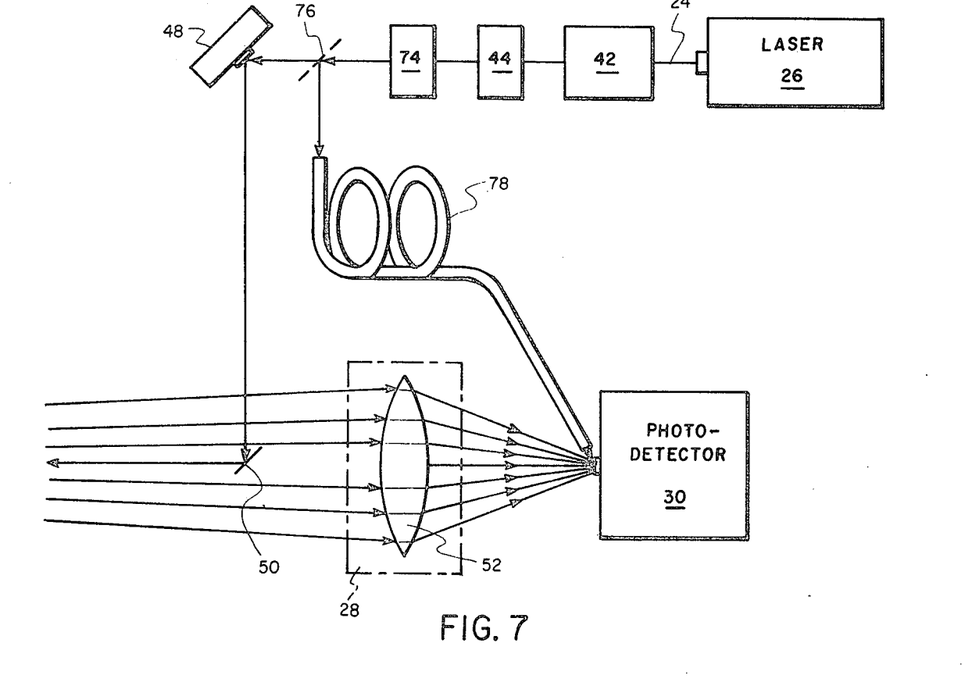
FIG. 7 is a schematic representation of the optical system of the preferred embodiment of the present invention.

Referring to FIG. 7 as well as FIG. 3, the light beam 24 is directed by a first mirror 48 and a second mirror 50 to the rotating log. The mirrors 48 and 50 direct the transmitted light beam along a path coaxial with the received light beam reflected from the rotating log, resulting in particular advantages in that parallax errors which would otherwise result from different paths of the transmitted and received light beams are eliminated, and the field of view of the receiving telescope 28 is minimized thereby minimizing the ambient light collected by the telescope and thus improving the signal-to-noise ratio of the received signal. Since the transmitted beam is very narrow relative to the received beam, which becomes widely dispersed upon reflection from the surface of the rotating log, the mirror 50 is very small compared to the size of the lens 52 of the receiving telescope 28 (see FIG. 7) and therefore does not block the field of view thereof to any significant amount. The received light is focused by the telescope lens upon a demodulating photo-detector 30, which is comprised of any of a number of commonly known photo-electric devices.

Folowing demodulation of the received signal the detected signal is amplified by a selective 60 MHz amplifier 54 which provides an adequate amplitude for input to the phase-shifter 34. Prior to application of the detected signal to the 60 MHz comparator it is applied to the aforementioned calibrated, digitally-controlled phase shifter 34 which selectively delays the detected signal according to a six-bit digital word applied thereto. While the phase-shifter in the preferred embodiment is in the received signal circuit, it should be recognized that such a system could also be modified to employ the phase shifter in the reference signal circuit. To provide the proper impedance load for the phase shifter 34 and input impedance to following circuitry a buffer amplifier 56 is placed therebetween.

The detected-signal input to the 60 MHz phase comparator 32 and its D-C output are coupled respectively to the buffer amplifier 56 and subsequent circuitry by a chopper-stabilizing circuit to eliminate the D-C offset inherent in the output of the comparator and any changes therein due to variations in the received signal intensity, as explained above with reference to FIG. 4. (While it is recognized that the output of the comparator varies with the changes in contour and reflectivity of the log as it is rotated, such variations are generally aperiodic so the output is considered to be essentially D-C). Accordingly, the output of the buffer amplifier 56 is connected to a R-F switch 58, such as a Diaco Industries, Inc. Part No. 100DO581-1-60, which drives a high-pass filter 60 whose output in turn is connected to the detected signal input of the phase comparator. The R-F switch 58 connects and disconnects the detected R-F signal at an audio-frequency, e.g. 10 KHz, in response to a signal provided by a clock 62. The switch thus modulates the detected signal at 10 KHz and the high-pass filter permits the modulated R-F to pass to the input of the comparator while blocking the audio modulation frequency. In conjunction therewith the output of the phase comparator is A-C coupled by a capacitor 64 to an A-F switch 66, which is driven synchronously with the R-F switch 58 by the clock 62, for rectifying the output of the comparator passed by the capacitor 64 in order to produce a signal having a D-C component proportional to the relative phase of the reference and detected signals. The output of the A-F switch 66 is then connected to a low-pass filter 68 for elimination of any A-C component thereof, resulting in a stable D-C comparator output signal.

The relative polarity of the aforementioned stable, D-C comparator output is tested by a sequencer circuit 70 which generates a digital word for adjusting the phase shifter 34 during the preliminary measurement stage of operation of the system. In addition, the comparator output is applied to a voltage-controlled oscillator 72 which generates pulses at a frequency which is a function of the comparator output signal. These pulses are received and counted over a predetermined period of time by the sequencer 70 for determining the average output voltage of the phase comparator during the interpolation stage of operation. The digital data from the preliminary and interpolation adjustment stages are transmitted to the associated computer 18 by the sequencer 70 in the form of three digital words, representing the preliminary measurement $DW_1$ and the following two averages $V_{1a}$ and $V_{2a}$, and from these data the computer determines the solution of the interpolation equation (2).

Zeroing of the instrument is accomplished by closing a shutter 74 in the path of the transmitted light beam 24. With the shutter closed, measurements of the phase comparator output are made, and these data may be used to refine the calculations of $V_{1a}$ and $V_{2a}$. The shutter is electromechanically controlled by the sequencer 70 under command from the computer for automatic zeroing.

Further calibration of the instrument is accomplished by electro-mechanically inserting a deflection mirror 76 in the path of the light beam 24, thereby directing the light beam through a fiber-optic tube 78 of known optical length on the order of twice the operating distance from the transceiver to the surface of the log, which in turn directs the light to the photo-detector 30. With the deflection mirror in place a value may be determined according to the aforedescribed distance-measuring procedure and a calibration factor may be computed therefrom. While only one fiber-optic tube is contemplated for this system it should be recognized that a number of selectable fiber-optic tubes of known length could be used for generating a calibration curve with more than one point or for calibrating the device at different operating distances from the log surface. Such fiber-optic tubes should be of high quality such that their transmission characteristics remain constant and therefore should be made of glass or some similarly temperature-stable material.

The sequencer 70 interfaces with the computer 18 for controlling the sequence of events within the transceiver portion of the ranging system and returning data to the computer. Upon receiving a command from the computer to measure the distance to the surface of the log, the sequencer first causes the transceiver to make a preliminary measurement of the distance to the surface of the log by testing the polarity of the comparator output and adjusting the six-bit input digital word to the phase shifter 34. The final digital word $DW_1$ from this preliminary measurement is then stored for input to the computer. Thereafter the sequencer causes the transceiver to determine the interpolation values $V_{1a}$ and $V_{2a}$ by counting the output pulses of the voltage controlled oscillator 72 during $P_{A1}$, arithmetically adding a bit to the phase shifter input word and counting the pulses during $P_B$, then subtracting the aforementioned bit and completing the integration for $V_{1a}$ by counting pulses during $P_{A2}$ and adding the latter count to the count during $P_{A1}$, resulting in two digital words representing $V_{1a}$ and $V_{2a}$ which are also stored. These data are then made available to the computer by the sequencer upon command therefrom and the computer calculates the distance to the log according to equation (2).

The calibration operations utilizing the shutter and fiber-optics are performed as needed to compensate for system drift upon command from the computer. The need for calibration will arise at various times depending primarily upon the ambient temperature of the environment in which the transceiver is used. Upon command from the computer the sequencer causes the shutter to close and two digital words representing $V_1$ and $V_2$ are generated. Similarly, upon command from the computer the sequencer causes the deflection mirror 76 to be inserted in the path of a light beam 24 and a measurement of the fiber-optic reference path is made in the usual manner. These data also are made available to the computer for use in interpolation and determining the calibration factor.

In summary, with reference to utilization of the optical ranging system in an apparatus for determining the optimum spin axis of a log to produce the maximum yield of veneer, the log 10 is placed in the charger 12 and rotated about an initial longitudinal axis in front of one or more light transceivers 16a–16n under control of the computer 18. The computer causes the transceivers, which are spaced along the length of the log, to make periodic measurements of the distance to the surface of the log at predetermined points around the circumference thereof based upon its angular rotational displacement. These measurements are made by transmitting a modulated light beam to the surface of the log, receiving the reflected light and measuring the relative phase of the envelopes of the transmitted and received light first by a preliminary phase balancing technique whereby the relative phase is adjusted by the calibrated phase shifter until nearly zero and thereafter by measuring the output of the phase comparator for two known settings of the phase shifter. These data are returned to the computer which calculates an accurate estimate of the actual distance to the log by linear interpolation based upon the two settings of the phase shifter and their respective comparator outputs. Finally, utilizing the angular-position data returned from the shaft encoder 20, the computer determines the contour of the log at a plurality of cross-sections and calculates the optimum spin axis of the log therefrom.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An electro-optical ranging system, comprising:
    a. a source of light radiation;
    b. means for amplitude modulating with a reference signal light radiated from said source;
    c. photo-electric means responsive to said modulated light radiation after it has traveled from said source over a distance to be measured for demodulating said light radiation to produce a detected signal;
    d. phase comparator means, responsive to said reference and detected signals, for producing a signal representative of the relative phase thereof;
    e. phase adjuster means, calibrated according to distance, for introducing an adjustment of the relative phase of said reference and detected signals to within a predetermined difference from null automatically in response to said relative-phase signal, whereby said distance to be measured is determined from said calibrated adjustment;

f. means associated with said phase adjuster means for introducing a second, further adjustment of the relative phase of said reference and detected signals from said first adjustment when the latter adjustment has been made to within said predetermined difference from null, said second adjustment being by an amount corresponding to a predetermined distance; and g. means responsive to said relative-phase signal for calculating said distance to be measured with more precision than said calibrated phase adjuster means by interpolation based upon said first and second adjustments and said relative-phase signal.

2. An electro-optical ranging system, comprising:
a. a source of light radiation;
b. means for amplitude modulating light radiated from said source by a reference signal;
c. photo-electric means responsive to said modulated light radiation after it has traveled from said source over a distance to be measured for demodulating said light radiation to produce a detected signal;
d. phase comparator means responsive to said reference and detected signals for determining their relative phase and producing a signal representative thereof;
e. phase shifter means for introducing an adjustment of the relative phase of said reference and detected signals by an amount proportional to a predetermined distance; and
f. means responsive to said relative-phase signal for calculating said distance to be measured by interpolation based upon said predetermined distance and said relative-phase signal.

3. The ranging system of claim 2 including means responsive to said relative-phase signal for integrating said relative-phase signal to produce an average thereof for calculating said distance to be measured.

4. The ranging apparatus of claim 2 wherein said phase shifter means comprises a digitally-controlled, variable delay line.

5. The ranging system of claim 2 further comprising a shutter disposed between said source of light radiation and said photo-electric means for blocking said light radiation to determine a reference zero relative-phase signal.

6. The ranging system of claim 5 further comprising electro-mechanical means connected to said shutter for operating said shutter automatically in response to an electrical control signal.

7. In an electro-optical ranging system having means for transmitting a light beam amplitude modulated by a reference signal, means for receiving and demodulating said light beam to produce a detected signal, phase comparator means responsive to said reference and detected signals for generating a D-C signal representative of the relative phase thereof, and circuit means responsive to said relative-phase signal for determining the distance to be measured, the improvement comprising:
a. modulating means for modulating one of said reference or demodulated signals at an audio-frequency prior to its input to said comparator means thereby producing a corresponding audio-frequency component in said relative-phase signal representative of the relative phase of said reference and detected signals;
b. coupling means responsive to said relative-phase signal for blocking the D-C component thereof while passing the audio-frequency component thereof; and
c. rectifier means connected to said coupling means and responsive to said audio-frequency component for producing a stable D-C output signal representative of said relative phase for input to said circuit means.

8. The ranging system of claim 7 wherein said modulating means comprises a radio-frequency switch and said rectifier means comprises an audio-frequency switch, both of which are operated synchronously.

9. An electro-optical ranging system for measuring the distance to a rapidly moving object, comprising:
a. means for illuminating a portion of said object with a light beam modulated by a reference signal;
b. means for receiving a portion of said light beam reflected from said object and demodulating said received portion to produce a detected signal;
c. means responsive to said reference and detected signals for determing their relative phase and producing a signal representative thereof;
d. phase shifter means for introducing an adjustment of the relatibe phase of said reference and detected signals an amount proportional to a predetermined distance; and
e. means for calculating by interpolation a portion of said distance to said moving object based upon said predetermined distance and said relative-phase signal.

10. A method for measuring a distance, comprising:
a. modulating a light beam with a reference signal;
b. transmitting said modulated light beam over said distance to be measured;
c. receiving a portion of said light beam after it has traveled over said distance to be measured;
d. demodulating said received portion of said light beam to produce a detected signal;
e. comparing said reference and detected signals to produce a signal representative of the relative phase thereof;
f. introducing an adjustment of the relative phase of said reference and detected signals by an amount proportional to a predetermined distance; and
g. calculating said distance to be measured by interpolation based upon said predetermined distance and said relative-phase signal.

11. The method of claim 10 further comprising first partially integrating said phase signal, thereafter adjusting the relative phase according to step (f) and completely integrating said relative-phase signal to produce an average value thereof, thereafter readjusting said relative phase to its original value and completing said first integration to obtain another average relative-phase signal value, and utilizing the two aforementioned average values to compute said distance to be measured.

12. An electro-optical ranging system, comprising:
a. a source of light radiation;
b. means for amplitude modulating with a reference signal light radiated from said source;
c. photo-electric means responsive to said modulated light radiation after it has traveled from said source over a distance to be measured for demodulating said light radiation to produce a detected signal;

d. phase comparator means, responsive to said reference and detected signals, for producing a signal representative of the relative phase thereof;

e. delay means, having a radio-frequency transmission line comprised of a plurality of electrical conducting portions which are electrically selectable to vary the effective electrical length of said transmission line, for introducing an adjustment of the relative phase of said reference and detected signals; and f. electronic control means, responsive to said relative-phase signal and calibrated according to distance, for controlling said delay means to automatically adjust the relative phase of said reference and detected signals to within a predetermined difference from null.

13. The ranging system of claim 12 wherein said delay means selects said conductors in response to a digital electrical input signal, and said electronic control means includes means for producing said digital signal for input to said delay means in response to said relative-phase signal according to a predetermined sequence of operations.

* * * * *

UNITED STATES PATENT AND TRADEMARK OFFICE
CERTIFICATE OF CORRECTION

PATENT NO. : 3,992,615
DATED : November 16, 1976
INVENTOR(S) : Robert R. Bennett and John C. Nosler It is certified that error appears in the above-identified patent and that said Letters Patent are hereby corrected as shown below:

| | | |
|---|---|---|
| Col. 1 | Line 60 | Change "referennce" to --reference--. |
| Col. 2 | Line 5 | Change "rotation" to --rotating--; |
| | Line 36 | Change "the" to --and--. |
| Col. 5 | Line 37 | Change "16-16n" to --16a-16n--. |
| Col. 6 | Line 1 | After "col. 7," insert the word --line--. |
| Col. 7 | Line 4 | Change "sigificant" to --significant--. |
| Col. 9 | Line 4 | Change "and" to --any--; |
| | Line 51 | Change "MHHz" to --MHz--. |
| Col. 11 | Line 23 | Change "electromechanically" to --electro-mechanically--. |
| Col. 14 | Line 27 | Change "relatibe" to --relative--. |

Signed and Sealed this

Fifteenth Day of March 1977

[SEAL]

Attest:

RUTH C. MASON
Attesting Officer

C. MARSHALL DANN
Commissioner of Patents and Trademarks